Figure 1:
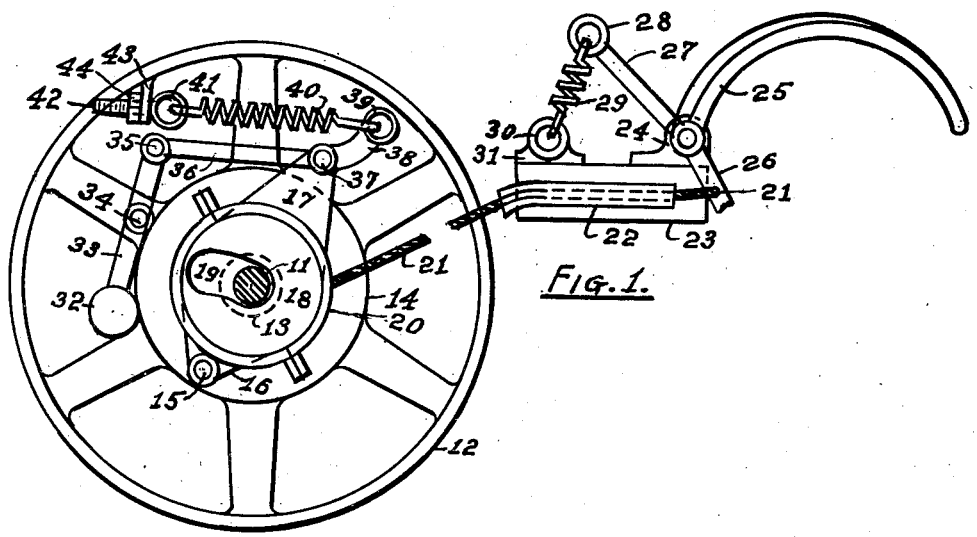

Sept. 26, 1944.     I. BENJAMINS     2,359,264

AIRCRAFT

Filed Feb. 11, 1942

INVENTOR:
Israel Benjamins.

Patented Sept. 26, 1944

2,359,264

UNITED STATES PATENT OFFICE 2,359,264

AIRCRAFT

Israel Benjamins, Brooklyn, N. Y.

Application February 11, 1942, Serial No. 430,323

9 Claims. (Cl. 244—11)

This invention relates to improvements in aircraft, and it consists in the novel features which are hereinafter described.

One of the objects of my invention is to produce a perfected aircraft comprising an ornithopter and aeroplane which may be taken off any level ground such as a meadow or building lot without the need of any hard and smooth runways of an airport.

Another object is to reduce the length of its run when the aeroplane is taken off taxiing on a runway of an airport.

A further object is to enable my improved aircraft to travel at various speeds and to stay at the same altitudes when flying at low speeds.

Another object is to enable an aeroplane to be taken off the deck of a ship, also from a very soft spot of ground.

A further object is to facilitate the landing of aeroplanes and to avoid collisions of aeroplanes with mountains or other obstructions.

Another object is to enable an aeroplane to have a larger angle of attack than is now usual without nosing over.

In the art heretofore integral propellers were inefficient at the beginning of the operation of taking off of the aeroplane due to the excessively coarse angle formed by the blades of the propeller with the direction of the relative wind acting on the blades of the propeller due to the slow forward velocity of motion and excessively high pitch of the blades to correspond to that velocity.

To overcome this difficulty propellers have been provided with variable pitch blades; these propellers are expensive and dangerous because of the enormous centrifugal force acting on them.

My invention provides a means for remedying this defect of integral propellers without changing the pitch of the same, as is hereinafter described.

A still other object therefore is to gradually increase the velocity of the propeller of the aeroplane with relation to that of the engine shaft as the forward velocity of the aeroplane gradually increases when or shortly after taking off, whereby the efficiency of the propeller may be increased without changing the angle of the blades of the propeller.

Another object is to provide a means for disconnecting the propeller from the engine shaft, whereby the engine may be tried out before taking off and for other purposes which are hereinafter referred to.

A further object is to provide an aeroplane in addition to the propeller, also with auxiliary ornithopter wings which may be oscillated with relation to the fuselage when it is desired or necessary, also to provide automatic means for varying the amplitude of oscillation of the said auxiliary wings, whereby to maintain the velocity of the engine shaft above a desired minimum.

In the art heretofore oscillating wings have been made either flat or slightly curved and provided with feathering devices or valves for reducing the pressure on the wings during their upstroke; the velocity of such wings had to be very slow, their area very large and their weight relatively great. To avoid these defects, I provide a high speed wing, integral in construction and substantially semicylindrical in transverse outline, whereby to attain a maximum of lift with a minimum of weight; the ends of my wing are substantially tangent to the direction of motion of the reacting air with relation to the wing; the air is thereby deflected by the wing through an angle of 180 degrees and is moved downwardly instead of being deflected sideways as in the prior art, thereby securing a maximum of lift for the aircraft with a minimum of weight of the wing.

A still other object is to facilitate precision bombing, spotting of submarines and other desired military operations.

Another object is to have the mechanism of my improved aeroplane, light, simple, durable and reasonably inexpensive.

Other objects and advantages will hereinafter appear.

I attain these objects by the devices which are hereinafter described and illustrated in the accompanying drawings or by any mechanical equivalent or obvious modification of the same.

Figure 2:
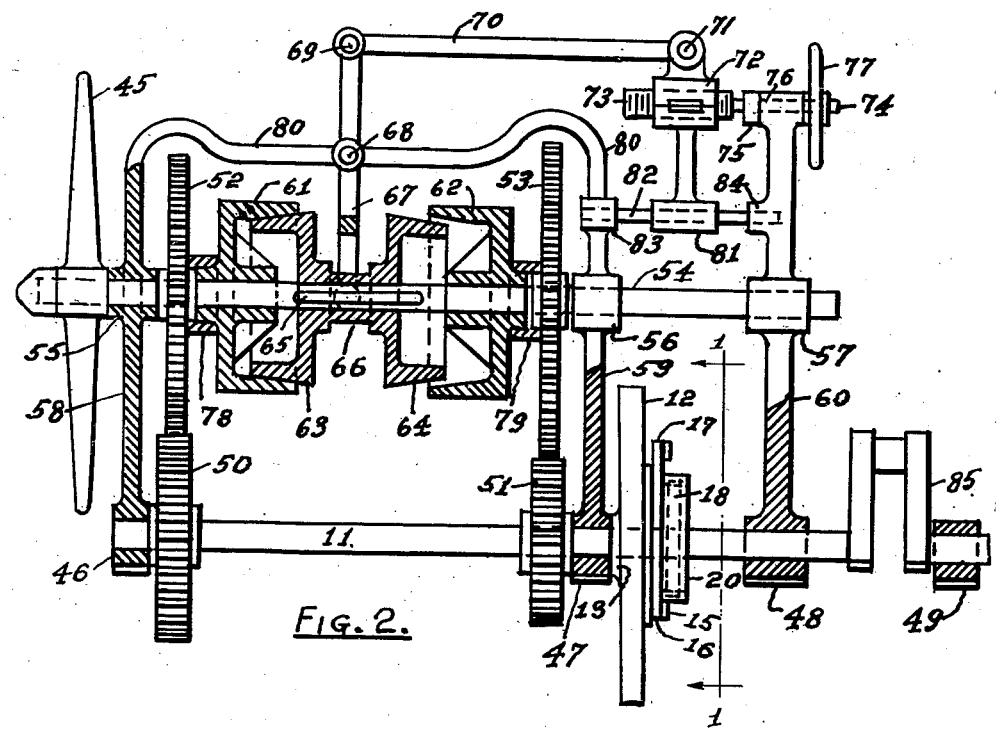

In the drawing, Fig. 1 is in part an end view on the line I—I of Fig. 2 and is a fragmentary view of a means for automatically varying the amplitude of oscillation of an auxiliary wing pivotally connected to a part of an aeroplane which is stationary with relation to the fuselage; and Fig. 2 is a fragmentary side view, partly in section and partly in elevation of an engine shaft of an aeroplane and a means for varying the velocity of the propeller with relation to the said shaft, also showing a side view of the said automatic means to a smaller scale than in Fig. 1. The fuselage and other standard parts of the aeroplane are omitted in both figures of the drawing for the sake of clearness.

Similar numerals refer to similar parts throughout the two views:

11 designates an aeroplane engine shaft which is shown in Fig. 1 as having mounted thereon a fly wheel 12 by means of a hub 13 and suitable fastenings which are not shown in the drawing.

The flywheel 12 is provided with a centrally situated boss 14 and the latter has pivotally connected thereto by means of a pin 15 one end 16 of a frame 16—17 which has integral therewith and extending rearwardly therefrom a slotted eccentric 18—19 which is encompassed by a strap 20 consisting of two parts joined to each other by flanges. The fastenings for connecting the flanges are omitted in the drawings as are all other fastenings.

The shaft 11 passes through the slot 19 of the eccentric 18—19.

In its initial position the center of the eccentric 18—19 coincides with the center of the shaft 11; but when the eccentric 18—19 with the frame 16—17 is turned on the pin 15 in a direction which is clockwise in Fig. 1, the center of the eccentric moves away from the center of the shaft 11 and the eccentricity of the eccentric 18—19 increases from zero to a desired magnitude as will be hereinafter described.

The strap 20 has connected thereto the inner end of a flexible member 21, which extends through a tube 22 which is shown as located along one of the spars 23 of one of the main wings of the aeroplane which are stationary with relation to the fuselage; only a small portion of the spar 23 is shown and the rest of the main wing, which may be of standard construction. is omitted in the drawing.

The member 21 is shown as a cord or cable, but it may be a chain or even a rod, if desired.

The spar 23 has mounted thereon near the outer end thereof a bearing 24 to which is pivotally connected the inner end of an auxiliary wing 25 which has thereon at the inner end thereof a horn or arm 26 to which is connected the outer end of the member 21.

Another arm 27 at the inner end of the wing 25 has connected thereto by means of an eye 28 at the end thereof the outer end of a stressed spring 29, the inner end of which is connected to the eye 30 of a plate 31 which is secured to the spar 23.

It is evident that rotation of the eccentric 18—19 through half of a revolution will cause the member 26 to pull on the arm 21, thereby turning the wing 25 downwardly; the spring 29 will thereby be stretched and will return the wing 25 to its original position during the other half of the revolution of the eccentric.

The connections of the wing 25 to the spring 29 and member 21 may be reversed, if desired, i. e., the spring 29 may be caused to move the wing 25 downwardly and the member 21 to raise it.

To prevent overloading of the shaft 11 I provide an automatic regulator which in addition to the slot 19 in the eccentric 18—19 and the pivoted frame 16—17, includes also a fly weight 32 at one end of a lever 33 which is pivoted at 34 to one of the arms of the flywheel 12; the other end of the lever 33 is pivotally connected at 35 to one end of a rod 36, the other end of which is pivotally connected at 37 to the end 17 of the frame 16—17.

An extension 38 on the frame 16—17 at the end 17 thereof terminates in an eye 39 which has connected thereto one end of a stressed spring 40, the other end of which is connected to the eye 41 of an eye bolt 42 which passes through a lug 43, which extends inwardly from the rim of the fly wheel 12; the bolt 42 is in engagement with a nut 44, which may be turned by means of a wrench, whereby to adjust the tension in the spring 40 to a desired degree of intensity.

When the velocity of the shaft 11 is below a desired minimum the spring 40 keeps the fly weight 32 in contact with the boss 14; the eccentric disc 18 then swivels in the strap 20 without moving the latter; the wing 25 is then stationary and serves as an extension of the main wing of the aeroplane.

When the velocity of the shaft 11 exceeds a desired minimum, the fly-weight 32 overcomes the resistance of the spring 40 and moves away from the boss 14, thereby turning the frame 16—17 with the eccentric 18 on the pin 15 as a pivot, thereby increasing the eccentricity of the eccentric 18—19; the strap 20 is thereby made to move to and fro and the wing 25 is thereby made to oscillate, until the amplitude of its oscillation is sufficiently large to stop the acceleration of the shaft 11; conditions are then stabilized until more power is supplied to the shaft 11, thereby increasing the amplitude of oscillation of the wing 25, or until the power supplied to the shaft 11 is reduced, when the amplitude of the oscillation of the wing 25 is also reduced or its oscillation ceases.

The spring 40 may be adjusted to predetermine the minimum velocity of the shaft 11 at which the wing 25 will start and stop to oscillate.

The pressure of the air on the concave underside of the wing 25, when the latter is oscillated, will be greater than the pressure on the convex upper side of the wing, thereby producing a lift.

Other forms of oscillating wings may be employed, if desired.

The second of a pair of auxiliary wings may be actuated in the same way or in a similar way, and may be controlled by the same regulator or by a separate regulator.

The center of pressure on the two oscillating wings should preferably be in advance of the center of gravity of the aeroplane and above it.

Instead of a tensile spring 29 a torsional spring may preferably be employed; the tensile spring is shown for the sake of easy illustration in Fig. 1.

Other forms of springs and resilient means other than springs may be employed.

The same may be true with relation to the spring 40.

The elements of the wing 25 in the direction of flight may be aerofoils and may have any desired angle of incidence; but I prefer to have their angle of incidence equal to zero, whereby they would not act in opposition to the effort of the propeller 45, which is hereinafter described.

When oscillating and with a positive angle of attack, the wing 25 will exert a drag and will tend to retard the forward motion of the aeroplane, which quality may be useful when it is desired to avoid collision with an obstruction such as a mountain, or when it is desired to land.

Instead of the shaft 11, any other shaft which is operatively connected to the shaft 11 may be employed to actuate the wing 25 and to have the hereinbefore described automatic regulator connected thereto.

To provide extra power for actuating the wing 25 when taking off the aeroplane, the power of the engine may be increased by opening the throttle wide; extra power may also be transferred from the propeller 45 to the wing 25 by reducing the velocity of the propeller 45 with relation to the shaft 11, or by disconnecting the propeller 45 from the shaft 11 altogether.

This variation of velocity of the propeller 45 may be accomplished in any standard or special manner; one good way of doing it is disclosed by the mechanism which is illustrated in Fig. 2, in which 46, 47, 48 and 49 designate bearings for rotatably supporting thereon the shaft 11, which has secured thereto the gears 50 in 51; the latter are in mesh respectively with the gears 52 and 53 which are swivelled on a shaft 54 to which the propeller 45 is secured.

The shaft 54 is rotatably supported by bearings 55, 56 and 57 which are respectively located on posts 58, 59 and 60 extending from the bearings 46, 47 and 48 respectively.

The post 58 may coincide with the front of the fuselage, if desired.

The shaft 54 has also mounted thereon a pair of friction clutches including a pair of interiorly conical shells 61 and 62 which are swivelled on the shaft 54, and a pair of cones 63 and 64 to fit these shells sliding on a spline 65; the cones 63 and 64 are integral with each other and have thereon a groove 66, to receive therein one end of a forked lever 67 which is pivoted at 68 on a frame 80 which is integral with or connected to the posts 58 and 59; the other end of the lever 67 is pivotally connected at 69 to one end of a rod 70, the other end of which is pivotally connected at 71 to a feed nut 72 which is in engagement with a feed screw 73.

The nut 72 is preferably made in two parts which may be connected to each other by lugs as shown, and the screw 73 should preferably be square threaded.

The screw 73 is secured to or is integral with a spindle 74 which has also secured thereto a sleeve 75, to prevent longitudinal displacement of the spindle 74, which is rotatably supported by a bearing 76 on a post which is an extension of the bearing 57 and has a handwheel 77 secured thereto at the outer end thereof.

The shells 61 and 62 are secured to the hubs of the gears 52 and 53 respectively by means of sleeve-couplings 78 and 79 respectively.

The nut 72 has thereon an extension which terminates in a socket 81 which slides on a rod 82 which is secured at its ends to bosses 83 and 84 on extensions of the said bearings 56 and 57 respectively.

The shaft 11 is shown as having at one end thereof a crank, which may be one of a number of cranks of an aeroplane engine.

The propeller 45, as shown in the drawing, is in "high gear." By turning the handwheel 77 in the proper direction, the lever 67 will disengage the cone 63 from the shell 61, thereby disconnecting the propeller 45 from the shaft 11; by continuing the turning of the handwheel 77 in the same direction, the cone 64 will engage the shell 62, thereby putting the propeller 45 into "low gear." By turning the handwheel 77 in the opposite direction, the above described series of operations may be reversed.

When the aeroplane is to be taken off the deck of a ship or from very soft ground the tail end of the aeroplane may first be raised a few feet and propped up to reduce the angle of attack of the aeroplane; the propeller should then be operatively disconnected from the shaft 11 and the engine throttle opened wide, thereby speeding up the shaft 11 and starting the shaking of the auxiliary wings 25.

As soon as the landing gear of the aeroplane leaves contact with the deck of the ship or the mud of the ground and before its angle of attack becomes too large, the propeller should be put into low gear to start the aeroplane in its forward flight before the tail end thereof reaches the ground. Some dexterity may be necessary for this operation to avoid inconvenient angles of attack of the aeroplane before it acquires a forward velocity sufficient to operate its elevator.

It is desirable, however, wherever possible, to take off the aeroplane with the propeller 45 in low gear, thereby allowing the aeroplane rudder and elevator to function after the aeroplane develops some forward velocity on the ground.

With the aeroplane above the ground a reasonably safe distance, the propeller 45 may be placed in high gear, thereby absorbing power from the shaft 11 and causing the wings 25 to be retarded or to stop.

The opening of the throttle may then be reduced to its normal extent and the oscillation of the wings 25 discontinued.

When the aeroplane is in flight, and it is desired to reduce its forward velocity, the propeller 45 may be changed from high gear to low gear, thereby starting the operation of the wings 25 which will then absorb the power released by the propeller 45, and the reduction of lift due to the slower rotation of the propeller 45 will be made up by the extra lift produced by the wings 25.

When the propeller is put into low gear as above described, the angle of attack of the aeroplane may also be increased, if desired, and the wings 25, pulling upwardly at a point in advance of the center of gravity will prevent nosing down of the aeroplane.

When the propeller 45 is disconnected from the shaft 11 altogether the amplitude of oscillation of the wings 25 will thereby be still further increased; the wings 25 will then absorb all the power of the shaft 11.

Opening of the throttle wide will also increase the amplitude of oscillation of the wings 25 and the lift produced by the same.

On aeroplanes with planetary gear transmissions, different devices for speed variation of the propeller 45 with relation to the shaft 11 may be employed. Such devices are available in the art of power transmission; more than two speeds may be provided, and special or standard devices for speed variation may be employed for all types of propeller transmissions.

The number of speeds of the shaft 54 may also be reduced to "one or none," as by a single clutch or shift gear in combination with my above described automatic regulator.

A separate clutch may be provided for the flywheel 12 and the parts shown as connected thereto in Fig. 1, whereby the wing 25 may have its motion discontinued independently of the velocity of the shaft 11.

The form of my improved aeroplane may also be varied by securing the propeller 45 to the shaft 11 which may be extended forwardly for that purpose; and the flywheel 12 with the eccentric 18—19 and the other parts of the regulator on it may be connected to the shaft 54 which would then be employed to actuate the wing 25; the other parts of the device may then be left as shown in the drawing.

The velocity of the propeller 45 on the shaft 11 will then be reduced, together with that of the shaft 11, as the amplitude of oscillation of the wing 25 will be increased when the shaft 54 is in high gear and vice versa.

An extra clutch on the shaft 11 may then be provided for disconnecting therefrom the propeller 45, as when it is desired to discontinue the forward motion of the aeroplane, or to take an aeroplane off the deck of a ship as hereinbefore described.

Where lower cost is desired the eccentric 18 without the slot 19 thereon may be retained on the shaft 11 in either of the two variations of my aeroplane, and the flywheel 12 with the other parts of the regulator omitted, after determining by experiment the proper amplitude of oscillation of the wing 25 which will not stop the shaft 11 or unduly retard it.

The employment of the flexible member 21 to turn the wing 25 in one direction and the spring 29 to turn it in the opposite direction is advantageous in that it avoids the use of long connecting rods which would have to be heavy to prevent buckling or oscillating beams which would be subject to bending stress and would, therefore, also have to be much heavier than the members 21 and 29.

In my above described aeroplane mechanism, the efficiency of the propeller, when the aeroplane is taken off, would be improved by gradually increasing the velocity of the propeller as the forward speed of the aeroplane increases; this result will be attained without changing the angle of the blades of the propeller, thereby increasing the simplicity, safety and inexpensiveness of the propeller.

This last modification of my device may conveniently be combined with an adjustable nose for aeroplanes, such as described in my pending application for patent for "Means for eliminating the shock of collision of aeroplane wings with the headwind," filed February 24, 1940, Serial No. 320,674.

This combination would have a military value in that the velocity of the aeroplane could be somewhat reduced and maintained low by increasing the angle of attack of the aeroplane to a certain extent.

It is also possible that by flying at a low velocity in this way may prove more economical of fuel than by running at full speed, thereby increasing the mileage covered by the aeroplane for a given quantity of fuel.

Even if only one solitary clutch of my mechanism be retained, it will afford the advantage of being able to try out the engine first before taking off the aeroplane, thereby increasing the safety of aeroplanes.

Other variations are possible, and parts of my invention may be used without other parts; I do not, therefore, restrict myself to the details as shown in the drawing.

I claim as my invention and desire to secure by Letters Patent:

1. In an aircraft an aeroplane, a main wing which is fixed with relation to the aeroplane, an engine shaft, a propeller operatively connected thereto, for moving the main wing forwardly, whereby to produce an adequate lift for normal velocity flying of the aeroplane, an auxiliary lifting means actuated by the engine shaft and disposed to exert a lift on the said aeroplane in a substantially vertical direction transversely to the direction of flight and independently of the forward motion of the aeroplane, a means for operatively connecting the auxiliary lifting means to the engine shaft whereby to augment the lift produced by the main wing for subnormal velocity flying of the aeroplane and a means for automatically varying the linear velocity of the auxiliary lifting means as the velocity of the engine shaft changes controlled by the change in the shaft velocity, whereby to vary the lift contributed by the auxiliary lifting means for different subnormal velocities of flying of the aeroplane.

2. In an aircraft an aeroplane, a main wing which is stationary with relation to the aeroplane, an engine shaft, a propeller operatively connected thereto, for moving the main wing forwardly, whereby to produce an adequate lift for normal velocity flying of the aeroplane, an auxiliary ornithopter wing pivotally connected to a part which is stationary, with relation to the aeroplane and adapted to withstand a high velocity of oscillation, a means for oscillating the auxiliary ornithopter wing at a relatively high velocity, actuated by said shaft, whereby to augment the lift produced by the main wing for subnormal velocity flying of the aeroplane, and a quickly responsive means for automatically varying the amplitude of oscillation of the auxiliary ornithopter wing as the velocity of the engine shaft changes, controlled by the change in said velocity and operatively connected to said shaft, whereby to vary the lift contributed by the auxiliary ornithopter wing for different subnormal velocities of flying of the aeroplane.

3. The elements of claim 1, combined with a means for varying the rotary velocity of the propeller with relation to that of the engine shaft, thereby changing the velocity of the engine shaft and also the linear velocity of the auxiliary lifting means, whereby the aeroplane may be enabled to fly at different forward speeds and be in part sustained by the auxiliary lifting means at subnormal velocities of flying of the aeroplane.

4. The elements of claim 2, combined with a means for varying the rotary velocity of the propeller with relation to that of the engine shaft, thereby changing the velocity of the engine shaft and also the frequency and amplitude of oscillation of the auxiliary ornithopter wing, whereby an aeroplane may be enabled to fly at different speeds and be in part sustained by the auxiliary ornithopter wing for subnormal velocities of flying of the aeroplane.

5. In an aircraft an aeroplane, a main wing which is stationary with relation to the aeroplane, an engine shaft, a propeller operatively connected thereto for moving the said main wing forwardly, whereby to produce an adequate lift for normal velocity flying of the aeroplane, an auxiliary ornithopter wing pivotally connected to the aircraft and adapted to withstand a high velocity of oscillation, a means for oscillating the ornithopter wing actuated by the engine shaft, whereby to augment the lift produced by the main wing, for subnormal velocity flying of the aircraft, and a governor operatively connected to said shaft and to said oscillating means, said governor including a centrifugal mass disposed to be moved by and to have its position varied by changes in the velocity of the engine shaft, thereby changing the connection of said governor to said oscillating means in a way to increase the amplitude of oscillation of the auxiliary ornithopter wing as the shaft velocity increases, and a means for opposing and reversing the motion of the centrifugal mass, whereby to reduce the said amplitude as the shaft velocity decreases.

6. The elements of claim 5, the said opposing and reversing means comprising an initially stressed resilient means on said governor acting in opposition to the centrifugal mass and arranged to dispose the said connections in a way to eliminate the oscillation of the auxiliary wing when the shaft velocity is below a desired minimum.

7. The elements of claim 5, combined with an initially stressed spring on said governor acting in opposition to the centrifugal means, whereby to eliminate the oscillation of the auxiliary ornithopter wing when the shaft velocity is below a desired minimum, and a means for varying and adjusting the intensity of the initial stress of the spring, thereby predetermining the said minimum velocity of the engine shaft.

8. The elements of claim 2, combined with a means for operatively disconnecting the propeller from the engine shaft during the flight of the aeroplane, thereby causing the latter to be sustained by the auxiliary ornithopter wing.

9. In an aircraft an aeroplane, the combination of an aeroplane wing which is fixed with relation to the aircraft, an engine shaft, an integral propeller for moving the said wing forwardly, operatively connected to said shaft, and a means for enhancing the efficiency of the propeller when the aeroplane is being taken off, said enhancing means comprising a pair of auxiliary ornithopter wings operatively connected to said shaft, means for automatically varying the amplitude of oscillation of the ornithopter wings by a change in the velocity of the engine shaft above a required magnitude of said velocity and for discontinuing the said oscillation when the required magnitude is not exceeded, means for varying the rotary velocity of the propeller with relation to that of the shaft and means for disconnecting the propeller from the shaft, whereby when the aeroplane is to be taken off the propeller may first be disconnected from the shaft, to allow the shaft to be accelerated by the engine to a point above its normal velocity and thereby to bring the ornithopter wings into action, thereupon the propeller may be operatively connected to the shaft in a way to gradually increase its rotary velocity with relation to that of the shaft as the forward velocity of the aeroplane increases, thereby reducing the rotary velocity of the shaft to its normal velocity and thereby eliminating the oscillation of the ornithopter wings which serve to assist in sustaining the aeroplane when its forward velocity is low, the gradual increase of the rotary velocity of the propeller as the forward velocity of the same increases serving to keep the angle of attack of the relative wind acting on the propeller blades within proper limits, thereby enhancing the efficiency of the propeller.

ISRAEL BENJAMINS.